Figure 4:
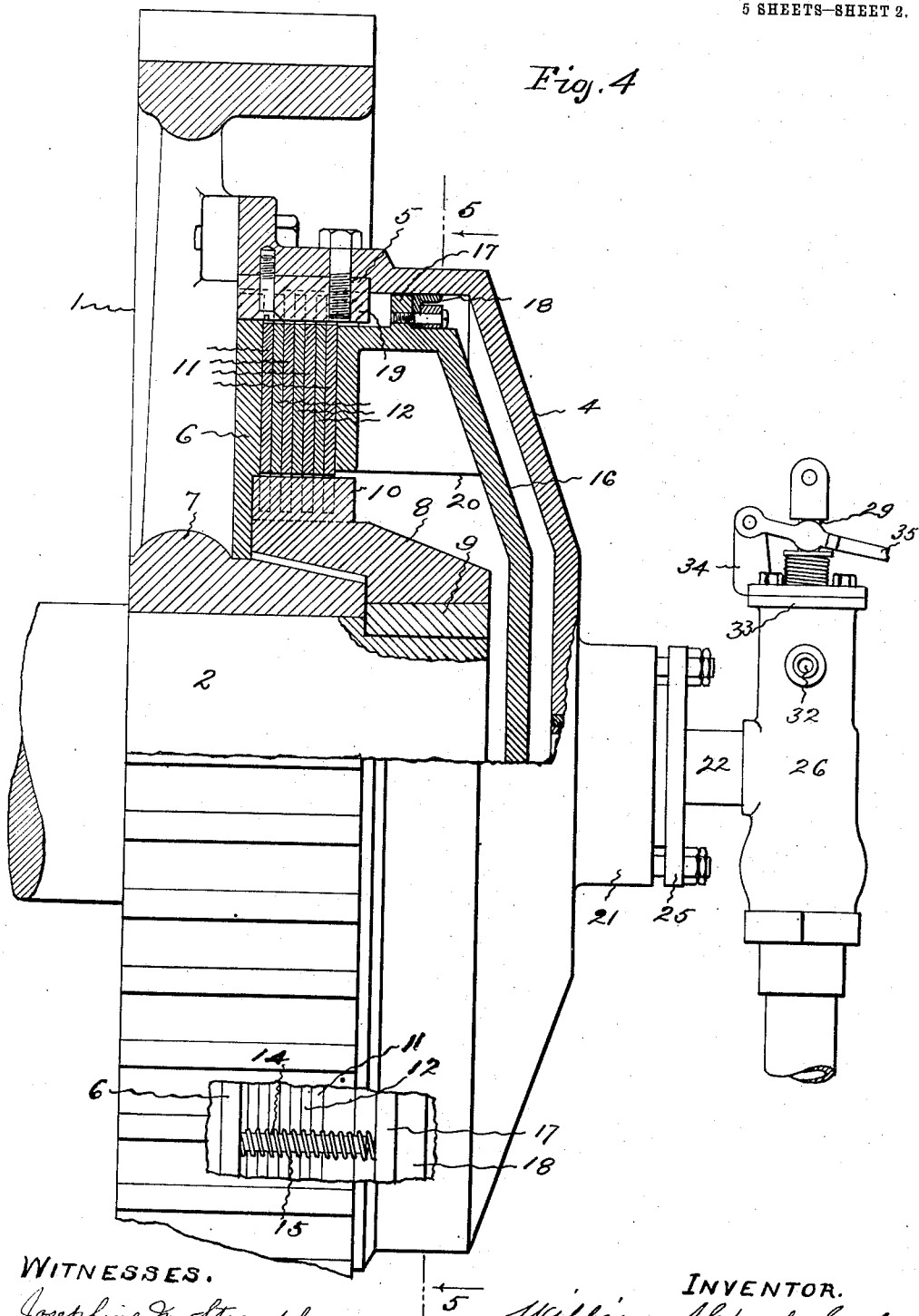

W. A. GORDON.
FLUID OPERATED SAFETY CLUTCH.
APPLICATION FILED APR. 14, 1911.
998,499.
Patented July 18, 1911.
5 SHEETS—SHEET 1.
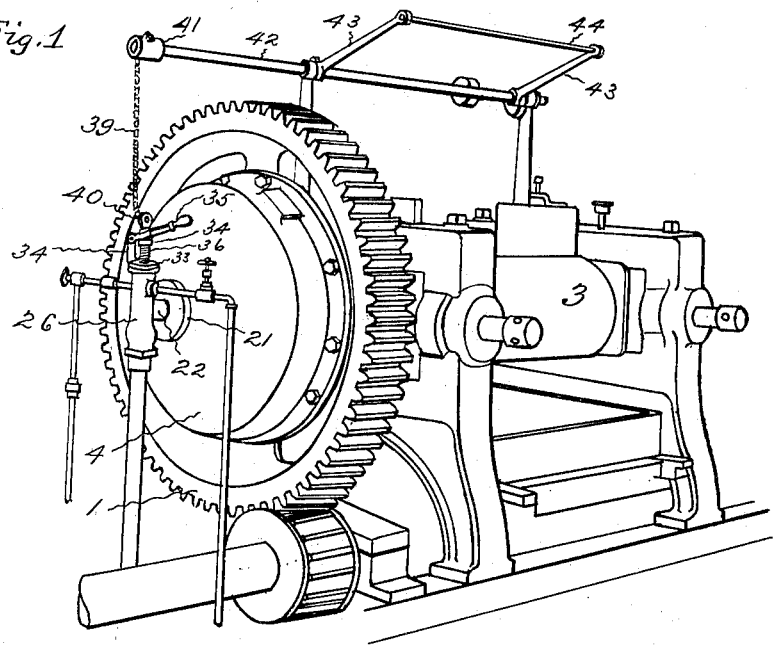
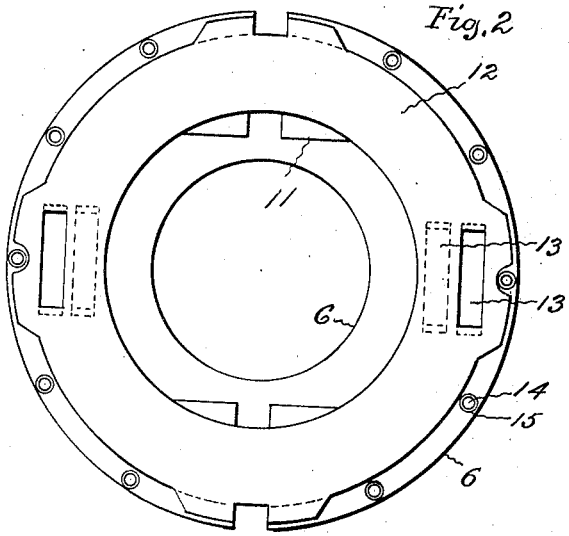
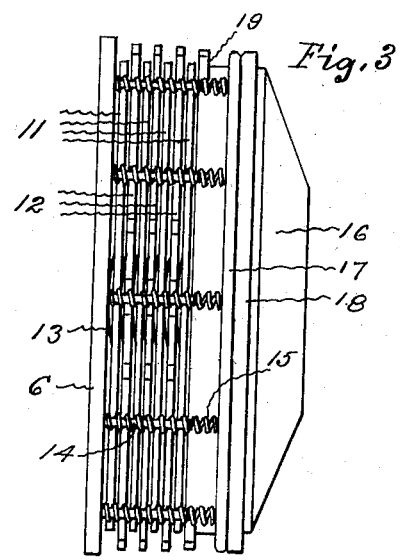
WITNESSES.
INVENTOR.

W. A. GORDON.
FLUID OPERATED SAFETY CLUTCH.
APPLICATION FILED APR. 14, 1911.

998,499.

Patented July 18, 1911.
5 SHEETS—SHEET 2.

WITNESSES.
Josephine M. Strempfer
Louis Lucia

INVENTOR.
William Alexander Gordon
Harry R. Williams
Atty.

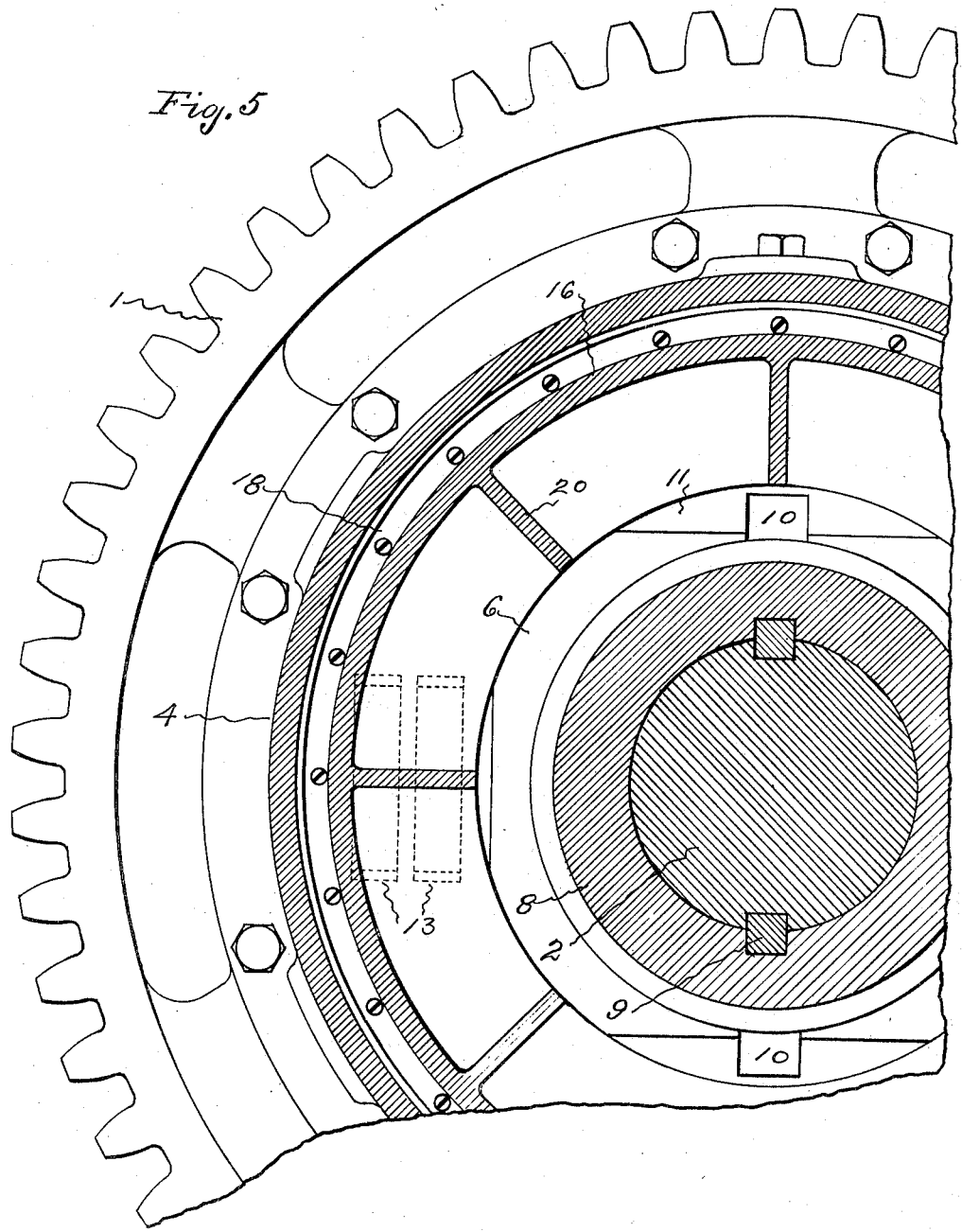

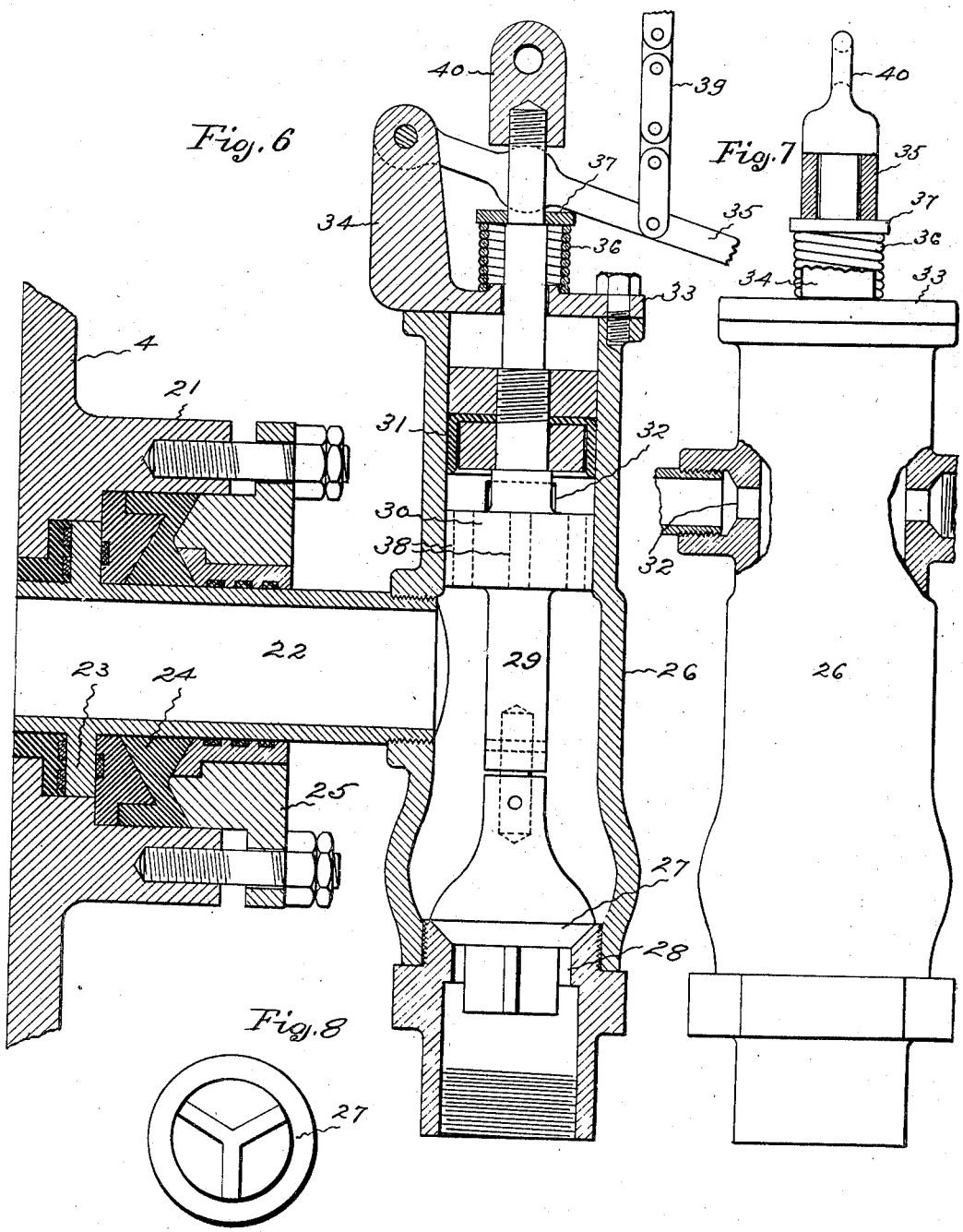

W. A. GORDON.
FLUID OPERATED SAFETY CLUTCH.
APPLICATION FILED APR. 14, 1911.

998,499.

Patented July 18, 1911.
5 SHEETS—SHEET 5.

WITNESSES.
Josephine M. Strempfer
Louis Lucia

INVENTOR.
William Alexander Gordon
Harry R. Williams
atty.

UNITED STATES PATENT OFFICE.

WILLIAM ALEXANDER GORDON, OF SHELTON, CONNECTICUT, ASSIGNOR TO BIRMINGHAM IRON FOUNDRY, OF DERBY, CONNECTICUT, A CORPORATION OF CONNECTICUT.

FLUID-OPERATED SAFETY-CLUTCH.

998,499.                Specification of Letters Patent.    Patented July 18, 1911.

Application filed April 14, 1911. Serial No. 621,061.

*To all whom it may concern:*

Be it known that I, WILLIAM ALEXANDER GORDON, a citizen of the United States, residing at Shelton, in the county of Fairfield and State of Connecticut, have invented a new and useful Improvement in Fluid-Operated Safety-Clutches, of which the following is a specification.

This invention relates to the class of clutches that are operated by water, compressed air, steam or other fluid under pressure, for connecting a rotary driving part with the part to be driven, and which are more especially designed for use in connection with heavy machinery operating under great power, such as calendering machines, rubber rolls, sugar mills, rolling mills, etc. But, of course, these clutches can be used in connection with lighter machinery designed to be driven at high speed, with which powerful, quick acting clutches are desirable. Clutches of this type must be powerful and sure, and must be so constructed that wear is reduced to a minimum and that they shall not slip under heavy loads. They should be capable of being easily and conveniently operated by the machine attendant, and they must act quickly for clutching and releasing, particularly the latter, when necessary to avoid injury or damage.

The object of this invention is to provide a comparatively simple and inexpensive, yet powerful and quick acting self-contained clutch of this nature, which is comparatively small, and can be readily built and applied, without the employment of great skill, or necessitating any substantial change to the rolls and shafts of various kinds of mills in present use. In attaining this object, a multiple disk form of clutch is utilized in order to obtain an extended friction area that will have but little wear. The disks of this clutch are alternately connected with a hub designed to be keyed to the driven element and to a housing designed to be fastened to the driving element, or vice versa, and they are arranged to be forced together by a large, freely movable piston constructed and mounted in the housing in such manner that it has a universal movement and can adjust itself to any inequalities of the disks so that it will exercise its maximum power when forcing the disks together, without exerting such pressure upon the parts as would necessitate the introduction of thrust bearings. These parts are contained in the housing in such condition that there is no leakage of the operating fluid, when the clutch pressure is on, or escape of lubricant, while the machine is in use. The housing containing these parts is readily attachable to many of the common forms of rolling mills, and is conveniently connected with a quick acting valve for admitting or exhausting the operating fluid.

The invention is illustrated in the accompanying drawings as designed for application to the roll of a rubber mill.

Figure 11:
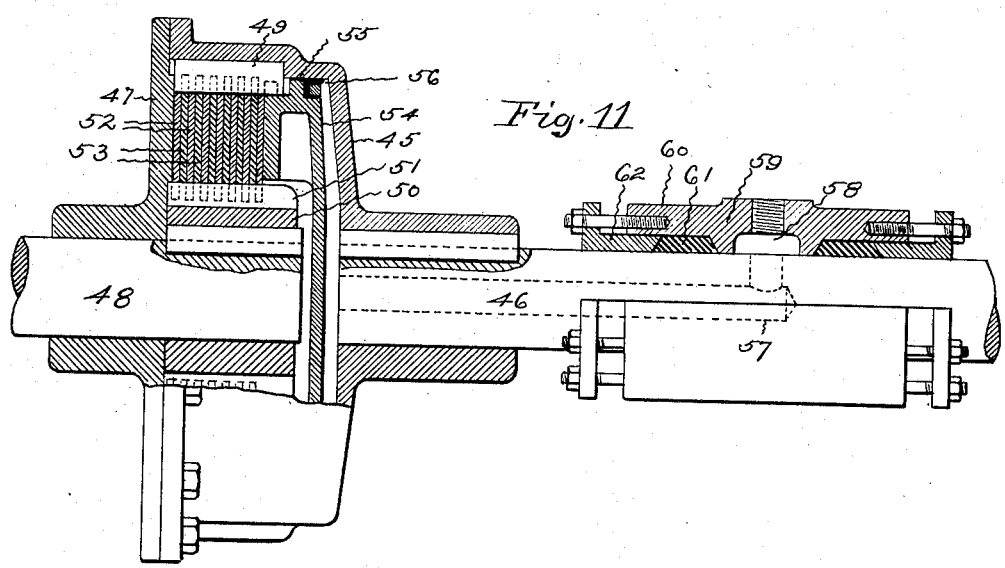
Figure 9:
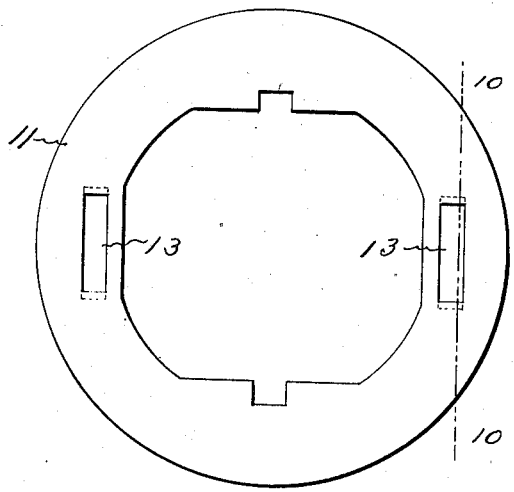
Figure 10:
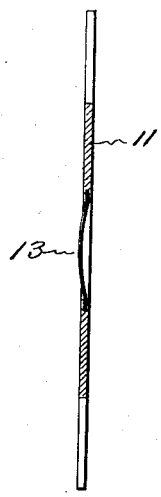

Figure 1 shows a perspective view of such a mill with a clutch which embodies this invention arranged to connect the driving gear with the roll journal. Fig. 2 is a plan illustrating the relations of the housing back-plate, the hub friction-disks and the housing friction-disks, also the positions of the springs which are employed to separate these disks and the springs employed to force back the piston. Fig. 3 shows an edge view of the parts shown in Fig. 2, and also an edge view of the piston. Fig. 4 shows on larger scale a side elevation, with portions cut in central section, of the driving gear and clutch, also a side elevation of the valve for controlling the operating fluid. Fig. 5 shows a section on the plane indicated by the dotted line 5—5 on Fig. 4. Fig. 6 shows a central section on still larger scale, of the operating valve and the stuffing box and of the housing. Fig. 7 shows a side elevation of the valve. Fig. 8 shows a bottom view of the valve disk. Fig. 9 shows a plan of one of the hub friction-disks. Fig. 10 shows a section of the hub friction-disk on the plane indicated by the dotted line 10—10 on Fig. 9. Fig. 11 shows the clutch designed for connecting two shafts.

The driving gear 1, of the machine illustrated, turns loosely on a portion of the journal 2 of one of the mill rolls 3. Bolted to the spokes of this gear is a housing 4 provided internally with one or more keys 5, Fig. 4. In the open end of this housing and forming the back thereof is the back plate 6. This plate has an opening in the center designed to fit the hub 7 of the gear, and grooves in its periphery shaped to fit the keys in the housing.

In the housing is the clutch hub 8 which is designed to be fastened to the end of the journal or other rotary part, by one or more keys 9, Fig. 4. The hub on its periphery has key lugs 10, Fig. 5. The friction disks 11 have notches that fit the key lugs on the hub, and the alternating friction disks 12 have notches that fit the keys in the housing. Mortises are made in these disks, which are alternately keyed to the clutch hub and to the housing, and in these are leaf springs 13. These springs curve outwardly so as to bear against the adjacent surfaces of the next disks and tend to separate the disks when the force holding them together is removed, Figs. 2 and 3. Mounted on studs 14 attached to the housing back-plate are springs 15, Fig. 3, which thrust between the back-plate and the piston in order to force the piston away from the plates.

The piston 16 which has substantially the conformation of the housing, but is considerably smaller, has a peripheral flange 17, the outer edge of which is formed on a circle, the center of which is at the axis of the piston so that the flange is practically a section of a sphere. This is shaped in this way so that the piston may have a slight rolling or universal movement as well as an axial movement in order that its back may lie flatly against the first hub friction-disk. Fastened to the front of the flange around the piston is a ring cup packing 18 which fits the cylindrical internal wall of the housing. Extending from the piston are lugs 19 provided with slots shaped to fit the keys in the housing. This causes the piston to rotate with the housing, but allows it a free movement back and forth without any liability of binding. Ribs 20 may be provided between the front and back of the piston near the outer edge for the purpose of strengthening the structure.

On the outside of the casing is a stuffing box 21. Projecting into this box is a pipe 22 for the operating fluid. This pipe has a flange 23, Fig. 6, that lies in a recess in the stuffing box. Any desired form and kind of packings 24 may be used in the box and compressed by a suitable gland 25 for keeping tight the joints between the stationary pipe and its flange and the rotary stuffing box. The pipe for the operating fluid communicates with the interior of the valve casing 26. In this casing is a valve disk 27 that is adapted to open and close against a seat through the outlet port 28. This disk is connected with the stem 29 that is provided with a piston 30 and a cup packing 31, the latter being located above the fluid inlet port 32, and designed to effect a balancing of the pressure. At the top of the casing is a head 33 provided with an arm 34, to which is pivoted a lever 35. A spring 36 is desirably placed under the washer 37 above the head of the valve, for the purpose of counterbalancing the weight of the parts, Fig. 6. When this lever is down the valve disk is closed against the seat about the outlet port and the piston is below the inlet port. Passages 38 are made through the piston so that when the parts are in this position, fluid pressure which enters the inlet port, can pass through the openings in the piston and through the stationary pipe, and be exerted on the face of the piston in the housing. One end of a chain 39 is desirably connected with the valve lever, as shown in Fig. 6, or with the screw-eye 40 at the top of the valve stem, as shown in Fig. 1. The other end of this chain may be connected with a drum 41 on a shaft 42 which is provided with rocker arms 43 that are connected by a bar 44. When this bar is depressed, the lever is raised. This, through the valve stem, lifts the piston so that it closes the inlet port, and lifts the valve disk so that it opens the outlet port, allowing the fluid, which was under pressure in the housing and exerting its force against the piston, to quickly escape. The valve casing which is shown in the drawings is provided with two inlet ports. These may be connected with the same source or different sources of fluid pressure, for instance one may be connected with a reservoir of compressed air, and the other may be connected with a supply of water having the necessary pressure. With this form of clutch, when the valve lever is down and the valve disk closes the outlet port, the fluid pressure entering through the inlet and passing through the openings in the valve piston, is exerted in the housing against the face of the clutch piston. The surface of this piston is so large that it is forced with great power against the disks, causing the faces of the housing-disks and hub-disks to bind together and firmly clutch the gear to the roll journal. As the fluid pressure is exerted between one face of the piston and the housing, and the piston crowds the hub-disks and housing-disks against the back-plate of the housing, the entire force is expended within the housing itself, and no part of it is so exerted as to crowd the gear upon the journal. This eliminates all necessity for the employment of thrust bearings of any kind. As the piston flange, which fits the interior of the housing, is the section of a sphere, the piston can be packed by the ring-cup-packing so that it will not leak, and yet the piston may tilt slightly as necessary so that its back face will conform to any irregularities of the friction disks which would tend to throw them out of parallel. When the valve-lever is lifted, or is drawn up by the chain, so the valve-piston closes the inlet port and the live pressure is cut off, and the valve-disk is lifted so as to open the big outlet port, the pressure in the housing is instantly exhausted. As the clutch piston is relieved of this pressure, it is thrust away from the disks by the springs arranged between it and the housing back-plate, and the disks are separated by the leaf springs which they carry. This causes the clutch to release instantly, and the machine to stop at once.

In Fig. 11 the clutch is shown as adapted for coupling two shafts. In this case the housing 45 is keyed to the shaft 46, while its back plate 47 turns loosely on the shaft 48. The housing has keys 49, and the hub 50 has key lugs 51. The friction disks 52 are keyed to the hub, and the alternate friction disks 53 are keyed to the housing. The piston 54, which is located in the housing as before, has its flange 55 rounded so as to permit it to tilt slightly. This piston is packed by a ring-cup-packing 56. With this form of clutch, which is substantially the same as the form first described, one of the shafts is provided with a passage 57 which communicates with an annular chamber 58 in a sleeve 59. This sleeve has at each end a stuffing box 60 with a packing 61 that is held in place by a gland 62. Any desired type of valve, preferably that form previously described, may be connected with the chambered sleeve which surrounds one of the shafts.

The clutch which embodies this invention is very powerful, due to the large surface of the piston and the extended frictional area provided by the large surfaces of the hub and housing disks. In the usual operation of large machines, this clutch is normally under pressure so as to connect the driving gear or pulley with the shaft or roll journal. In case of any accident, the pressure is exhausted very quickly, and the clutch parts instantly separated so that the machine will stop at once. This is particularly valuable when used in connection with rubber mill rolls and the like calendering rolls and other heavy rolling machinery in which operatives are frequently caught with disastrous results if the machine is not instantly stopped. These clutches being self-contained, can be applied to many types of machines in common use, without materially affecting their construction, and furthermore as they are self-contained, they are compact and there is no leakage. All of the parts of this clutch are simple to manufacture, they are easily assembled, no skill is required for adjusting them, and their life is long because there is a minimum amount of wear and such wear as there is does not affect the action because the piston has an unlimited movement, both axially and to an extent oscillatory.

The invention claimed is:

1. A clutch having a housing and a backplate connected thereto, a suitably packed piston movable in the housing, a hub in the housing back of the piston, a series of friction disks located in the housing between the piston and the back-plate, said disks being alternately keyed to the housing and to the hub, and means for admitting fluid pressure into the housing against the face of the piston.

2. A clutch having a housing and a back-plate connected thereto, a piston capable of a universal movement in the housing, a hub in the housing back of the piston, a series of friction disks located in the housing between the piston and the back-plate, said disks being alternately keyed to the housing and to the hub, and means for admitting fluid pressure into the housing against the face of the piston.

3. A clutch having a housing and a back-plate connected thereto, a piston movable in the housing, a hub in the housing back of the piston, a series of friction disks located in the housing between the piston and the back-plate, said disks being alternately keyed to the housing and to the hub, springs thrusting between the back-plate and the back of the piston for forcing the piston away from the disks, and means for admitting fluid pressure into the housing against the face of the piston.

4. A clutch having a housing and a back-plate, a piston movable in the housing, a hub in the housing back of the piston, a series of friction disks located in the housing between the piston and the back-plate, said disks being alternately keyed to the housing and to the hub, springs carried by the disks and arranged to normally thrust them apart, and means for admitting fluid pressure into the housing against the face of the piston.

5. A clutch having a housing provided with internal keys, a back-plate, a piston movable in the housing, a hub provided with external keys and located in the housing back of the piston, friction disks keyed to the housing, intermediate friction disks keyed to the hub, and means for admitting fluid pressure into the housing against the face of the piston.

6. A gear, a housing fastened to said gear, a back-plate, a piston movable in the housing, a journal extending through the back-plate into the housing, a hub keyed to said journal, a series of friction disks located in the housing between the piston and the back-plate, said disks being alternately keyed to the housing and to the hub, and means for admitting fluid pressure into the housing against the face of the piston.

WILLIAM ALEXANDER GORDON.

Witnesses:
M. E. DERMODY,
R. T. OLSSON.